Jan. 17, 1956 K. R. WARBURTON 2,731,040
FLEXIBLE HOSE

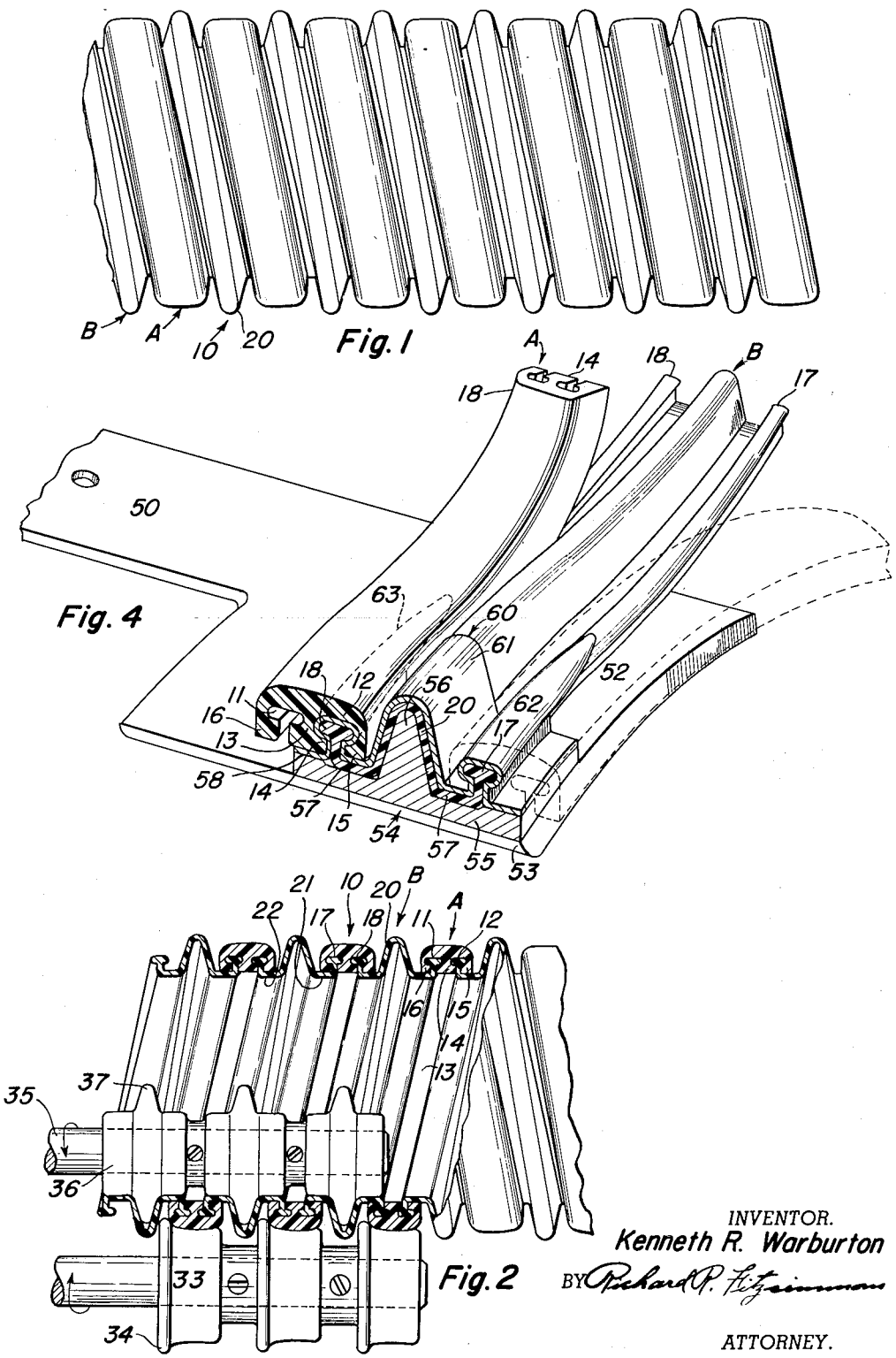

Filed March 2, 1953 2 Sheets-Sheet 2

INVENTOR.
Kenneth R. Warburton
BY Richard P. Fitzsimmons
ATTORNEY.

United States Patent Office 2,731,040
Patented Jan. 17, 1956

2,731,040

FLEXIBLE HOSE

Kenneth R. Warburton, Canton, Ohio, assignor to The Hoover Company, North Canton, Ohio, a corporation of Ohio Application March 2, 1953, Serial No. 339,503

18 Claims. (Cl. 138—49)

The present invention relates to a flexible hose and to the method of making the same and in particular to a flexible hose adapted for use with suction cleaners.

The flexible hose of the present invention, in its broadest aspects, consists of two strips of thermoplastic spirally wound in a side by side arrangement, in which the strips have mating edges secured together to form fluid tight spiral seams between the two strips.

Stated differently, the hose of the present invention consists of two cylindrical volutes of thermoplastic material having mating complemental edges on each side thereof with the mating complemental edges being interlocked with each other.

In the past flexible hose for use with suction cleaners have been made of thermoplastic material but it has been necessary to reinforce such hose with a metallic or other reinforcing member usually wound spirally within the interior of the hose or within the wall of the hose.

According to another feature of the present invention one of the strips from which the hose is made is formed of a thermoplastic material, which when completely set, is comparatively stiff or rigid, at least sufficiently so to prevent collapse of the hose in use, while the other strip is formed of a comparatively soft and flexible thermoplastic material to give the hose the desired flexibility.

According to another feature of the present invention, the material of the more flexible strip is bulged outwardly between the spiral seams between it and the other strip to give the hose additional flexibility.

The hose of the present invention may be made in a number of different ways. Broadly, according to the method of the present invention two separate and distinct strips of thermoplastic material are extruded in continuous or indefinite lengths.

The two strips are formed into side by side cylindrical spirals or volutes and with two sets of complementary interlocking mating joint elements, one set for each of the adjacent edges of the volutes and the complementary mating joint elements are interlocked together to form the cylindrical wall of the completed hose.

One set of the complementary mating joint elements may be interlocked together before the coils are formed, either by a separate operation, or just prior to the coil forming operation and the other set interlocked together as the coils are formed. In the latter case both strips may be led directly from their respective extruders to the hose former or may be led to the hose former from reels upon which the strips are stored.

Both of the strips may first be formed into volutes and both sets of joint elements thereafter interlocked together.

One of the strips may be preformed into a cylindrical volute with its convolutions spaced apart to receive the other strip. The second strip may then be fed to the hose former simultaneously with the preformed coil and the joint elements locked together as above described.

Both coils may be preformed into cylindrical volutes and the coils opened slightly as they are simultaneously led to the hose former and the joint elements locked together as above described.

Other objects and advantages of the present invention will become apparent as the description proceeds when taken in connection with the accompanying drawings in which:

Figure 1 is a plan view of a short section of the hose of the present invention;

Figure 2 is another view of a short section of the hose of the present invention partly in section and showing one manner by which the complementary edges of the strips may be interlocked together;

Figure 4 is an enlarged perspective view of the guide means of the apparatus of Figure 3 showing how the complementary edges of the two strips are interlocked together.

Figure 3:
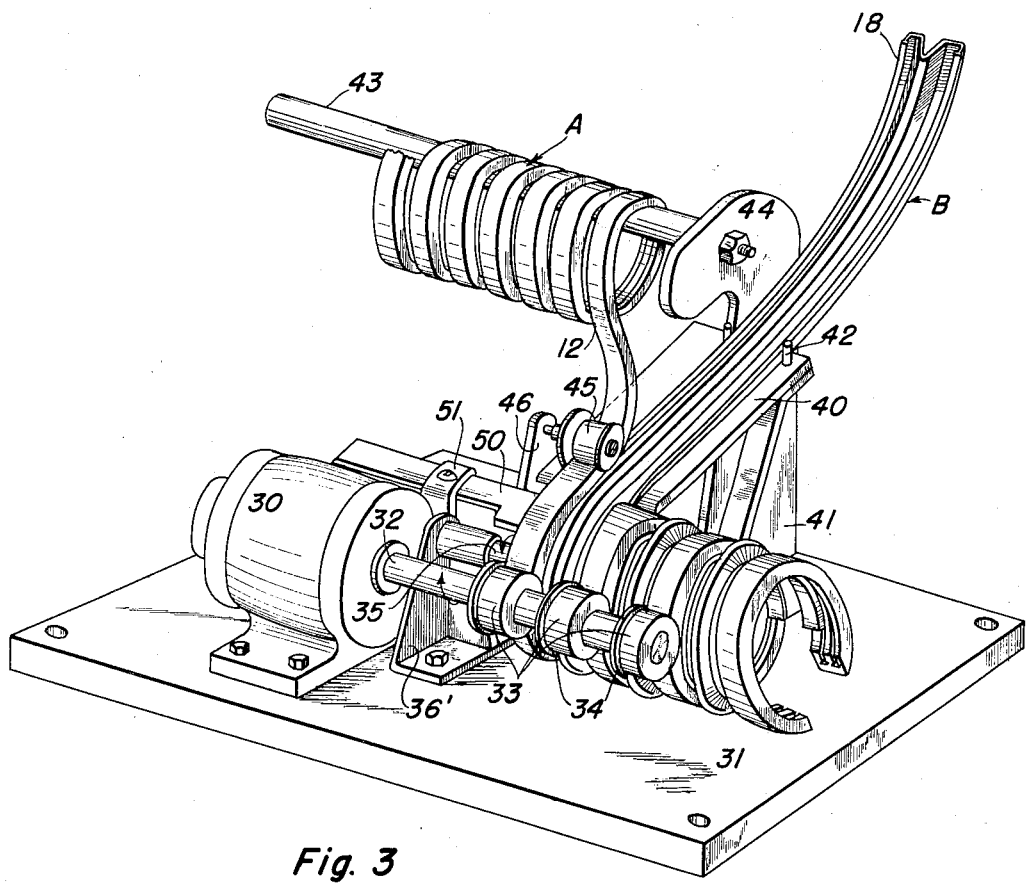
Figure 3 is a perspective view of an apparatus by which the hose of the present invention may be formed and showing the two strips being interlocked with each other.

Referring to the drawings and particularly to Figs. 1 and 2 thereof, the hose of the present invention is generally indicated by the reference numeral 10. The hose 10 is formed of first and second spirally wound extruded strips A and B respectively, formed of an elastomeric thermoplastic material interlocked with each other at their adjacent edges, strips A and B being wound in a sort of tandem or side by side cylindrical spiral arrangement.

The strip A is formed with inwardly opening reentrant T-shaped channels 11 and 12, one adjacent each of its edges and extending the full length thereof. The channels 11 and 12 are separated by an inwardly extending continuous interlocking rib 13, it being noted that rib 13 is enlarged at its inner edge or of inverted T-shape in cross section as shown in Fig. 4, to form a pair of wings, as shown at 14. From the foregoing description it can be seen that the edges of strip A extend inwardly at 15 and 16 in a sort of L-shaped cross sectional configuration for a purpose which will presently appear.

The strip B, is formed with a pair of outwardly extending continuous ribs 17 and 18, one adjacent each of its edges, it being noted that the ribs are wider at their outer edges, or of T-shaped cross-section as shown in Fig. 4, so as to mate with and interlock with the reentrant grooves 11 and 12 respectively of strip A. Between the ribs 17 and 18, the strip B is outwardly bulged as shown at 20 to form a flexible spiral corrugation along the length of the hose. Between the bulge 20 and the ribs 17 and 18 the strip B is provided with flat sections 21 and 22 as clearly shown in Figure 2.

It will be noted, from the foregoing description, that the female joint element 12 etc. of strip A interlocks with the male joint element 18 etc. of strip B and that the female joint element 11 etc. of strip A interlocks with the male joint element 17 etc. of the strip B. Thus there are two interlocked joints provided, one at each of the adjoining edges of the tandem coiled strips A and B.

The strip A is preferably made of a comparatively stiff or rigid elastomeric thermoplastic material while the strip B is preferably made of a more flexible elastomeric thermoplastic material. It is well known in the art that the rigidity or flexibility of many thermoplastics may be easily controlled by the amount of plasticizer added to the thermoplastic compound. For the purpose of the present invention it may be stated that the strip A be made rigid enough that the finished hose will not collapse when suction is applied or when trod upon by the operator and the strip B should be made sufficiently flexible so that the completed hose will have sufficient flexibility for the purpose intended for example for use with suction cleaners.

Thermoplastics also have the property that they can be made of almost any color desired by adding the proper coloring matter to the mix prior to extruding. If it is desired that the finished hose have a variegated appearance the strip A can be made of one color and the strip B of another.

The strips A and B can both be made from the same material, either comparatively stiff or rather flexible, it being noted that the strips must of necessity retain their volute form once the mating joints are interlocked. It is preferable however, that for use with suction cleaners, one strip should be made of a comparatively stiff material to provide the necessary rigidity against collapse and the other of a rather flexible material to provide the necessary flexibility.

It is not necessary, to the broadest aspects of the present invention, that the grooves 11 and 12 and ribs 17 and 18 be of T-shape in cross section. The edges of strips A and B may be interlocked together in any manner so long as air tight joints are formed. For example, the wide portions of the grooves, and ribs may be of a diamond shape in cross section so that the grooves and ribs may be more readily interlocked together.

It is also within the purview of this invention that the interlocking joint members be formed to face laterally from the strips rather than from their faces as shown.

Method of making

The hose of the present invention may be made in a variety of ways, one method being shown in Figs. 2, 3 and 4.

Broadly, however, according to the present invention the strip A may be extruded in continuous or indefinite lengths from the proper mix of a thermoplastic material, and the strip B similarly extruded from another suitable mix of thermoplastic material and two strips interlocked together in a side by side spiral formation as shown on Fig. 2 in any suitable manner.

For example, the strip A may be spirally coiled during the extruding operation into the form shown in Figure 3 and the strip B interlocked with it so that both will take their side by side spiral configurations.

Alternatively, the strip A can be fed directly from the extruder, while not fully set and fed to a coiling machine simultaneously with strip B, whereby the two may be easily interlocked together before the material of strip A has completely set. The strip B may also be fed directly from the extruder or from a reel as is desired.

Apparatus of Figures 2, 3 and 4

Referring to Figures 2, 3 and 4 one apparatus for forming the hose of the present invention and for carrying out the method of the present invention is disclosed.

A motor 30 is mounted on a base plate 31 and drives a shaft 32 which carries a plurality of cylindrical advancing and interlocking rollers 33 having a flange 34 for a purpose which will later appear.

A second shaft 35 is rotatably carried by a bracket 36' supported from the base 31 adjacent to motor 30 and to one side of the motor shaft 32. The shaft 35 carries a plurality of interlocking rollers 36 having central flanges at 37 for a purpose which will later appear.

A feed table 40 is supported from the base 31 by means of supporting brackets 41. The table 40 carries a plurality of guide pins 42 to guide the strip B in a manner which will later appear.

A rod 43, for carrying a previously coiled strip A is supported from the base 31 by a bracket 44. The strip A is guided on table 40 by an idler guide roller 45 rotatively supported on the upper end of bracket 46 also supported on the base 31.

A guide plate 50 is supported from the base 31 by means of a bracket 51. The guide plate 50 has a widened end 52 which is of curved formation for a purpose which will later appear. Mounted adjacent the front edge 53 of the end 52 is a guide generally indicated by the reference numeral 54.

The guide 54 includes a male guide 55 mounted on the plate 50. The male guide 55 is formed with an upwardly extending guide number 56 which conforms in shape to that of the inner side of bulge 20 of strip B and with depressions 57 to receive the straight sections 21 and 22 of strip B.

The guide 54 also includes a female guide member 60 supported at 58 on the male guide number 55. Female guide member 60 includes a sleeve 61 conforming in shape to the exterior of bulge 20 of strip B, and a pair of hollow spreaders 62 and 63. The spreaders 62 and 63 are pointed at their rear ends and are of hollow construction to receive the ribs 17 and 18 of strip B on their interiors while their exteriors are shaped to spread the walls of the reentrant grooves 11 and 12 of strip A outwardly as will later appear.

Operation on Figures 2, 3 and 4

An indefinite or continuous length of strip A may be previously coiled and placed on rod 43. The strip B may be led directly from an extruder or from a reel upon which the strip B may be stored as it is extruded in a continuous or indefinite length.

The ends of strips A and B are first led over the table 40 by hand, and the strip A being fed beneath the guide roller 45. The right hand groove 12 of strip A is fed over the exterior of spreader 63 until the end extends just to the front end of guide 54. The end of strip B is then fed into guide 54 with the left hand rib 18 entering the interior of spreader 63, the right hand rib, 17, entering the interior of spreader 62 and with the bulge 20 entering the space between the sleeve 61 and the male guide number 56 until the ends of the two strips are in alignment.

Both strips A and B are then fed by hand so that their ends extend between the first pair of rollers 33 and 36. It is to be noted that as the strips A and B emerge from the guide 54, the left hand rib 18 of strip B will lie within the right hand groove 12 of strip A. If desired either the motor 30 or the bracket 36' may be made adjustable so that the ends of the strip may be more easily fed by hand into a position between the rollers 33 and 36.

Once the strips are fed between the rollers 33 and 36 sufficient pressure is exerted on the strips that upon rotation of the motor shaft 32, clockwise as indicated by the arrows, the strips will be automatically fed through the guide 54. The device is preferably operated by hand for one complete revolution to assure that as the end of strip A moves counter-clockwise over the rounded end 52 of guide plate 50, and that the end of the left hand groove 11 of strip A will be fed over the end of the opener 62 so that the right hand rib 17 of strip B will be positioned interiorly of the left hand groove 11 of strip A.

The motor 30 may then be energized to rotate clockwise as shown and the strips A and B will be drawn through the guide 54 to position the ribs 17 and 18 of strip B on the interior of grooves 11 and 12 of strip A. As strips A and B pass between the rollers 33 and 36, roller 36 will be driven counter-clockwise by frictional contact with the strip A.

The co-action between the flat faces of rollers 33 and 36 and between the flanges 34 and 37 will cause the ribs or joint elements 17 and 18 to be firmly locked within the groove or joint elements 11 and 12. Additionally, the material of the strip A being comparatively stiff the walls of the grooves 11 and 12 will return to their original position and tightly grip the ribs 17 and 18 to form an air tight joint at the spiral seams between the strips A and B.

As previously stated, the strips A and B may be made of continuous or indefinite lengths and as a result a continuous length of hose may be made by the process of this invention, to be later cut to the proper length as needed.

While I have shown and described but a single embodi-

I claim:

1. The method of making a flexible hose comprising, forming first and second strips of continuous or indefinite lengths from thermoplastic material and with mating complementary edges on each side of the strips formed to be interlocked together, forming said strips to cylindrical volutes with the convolutions of the first and second strips in side by side relationship and interlocking said complementary mating edges together.

2. The method according to claim 1 in which the volute forming and interlocking steps are carried out simultaneously.

3. The method according to claim 1 in which one of the mating complementary edges of one side of said strips are interlocked prior to the volute forming step and the mating complementary edges of the other side of said strips are interlocked during the volute forming step.

4. The method of making a flexible hose comprising, forming first and second strips from thermoplastic material, said first strip being formed with female joint elements along each of its edges, said second strip being formed with male joint elements along each of its edges adapted to be interlocked with the female joint elements of said first strip, forming said strips into cylindrical volutes with the convolutions of the first and second strips in side by side relationship and interlocking the male joint elements of said second strip with the female joint elements of said first strip.

5. The method according to claim 4 in which the volute forming and interlocking steps are carried out simultaneously.

6. The method according to claim 4 in which the male joint element along one edge of said second strip is interlocked with the female joint element along one edge of said first strip prior to the volute forming step and the male joint element along the other side of said second strip is interlocked with the female joint element on the other side of said first strip during the volute forming step.

7. The method of making a flexible hose comprising, forming a first strip from a comparatively stiff thermoplastic material, forming a second strip from a comparatively flexible thermoplastic material, said first and second strips being formed with mating edges on each side thereof with the edges of one strip being formed to be complementary to and to be interlocked with those of the other strip, forming said strips into cylindrical volutes with the convolutions of the first and second strips in side by side relationships and interlocking said mating complementary edges together.

8. The method according to claim 7 in which the volute forming and interlocking steps are carried out simultaneously.

9. The method according to claim 7 in which one of the mating complementary edges on one side of said strips are interlocked prior to the volute forming step and the mating complementary edges on the other side of said strips are interlocked during the volute forming step.

10. The method according to claim 7 in which said first strip is preformed into a cylindrical volute with the convolutions spaced apart to later receive said second strip between them.

11. The method according to claim 10 in which the preformed convolutions of said first strip are straightened out prior to the side by side volute forming step.

12. A flexible hose comprising, two side by side cylindrical volutes of thermoplastic material having mating complemental edges on each side thereof and said mating complemental edges being interlocked with each other one of said volutes being made of a comparatively stiff thermoplastic material, and the other being made of a more flexible thermoplastic material.

13. A flexible hose according to claim 12 in which the volute which is made of the more flexible material is outwardly bulged between its edges to form a flexible spiral along the length of the hose.

14. A flexible hose comprising, first and second cylindrical volutes of thermoplastic material arranged in a side by side relationship, said first volute having female joint elements extending along each of its edges and said second volute having male joint elements extending along each of its edges and being complemental to and interlocked with female joint elements of said first volute one of said volutes being made of a comparatively stiff thermoplastic material, and the other being made of a more flexible thermoplastic material.

15. A flexible hose according to claim 14 in which the volute which is made of the more flexible material is outwardly bulged between its edges so as to form a flexible spiral along the length of the hose.

16. A flexible hose comprising, first and second spirally wound elastomeric thermoplastic strips, said first strip being formed with a pair of inwardly facing channels one adjacent each of its edges and extending the full length thereof, said second strip being formed with a pair of outwardly extending ribs one adjacent each of its edges and extending full length thereof, the outwardly extending ribs of said second strip being interlocked with the inwardly facing channels of said first strip.

17. A flexible hose according to claim 16 in which said second strip is formed with an outwardly bulged flexible longitudinally extending section between said outwardly extending ribs to form a flexible spiral corrugation extending along the length of the hose.

18. An all plastic flexible hose formed of two strips, spirally wound in side by side formation and interlocked at their overlapping edges, one of said strips being formed of a soft flexible elastomeric material and other of a more rigid elastomeric thermoplastic material.

References Cited in the file of this patent

UNITED STATES PATENTS

| | | |
|---|---|---|
| 1,702,123 | Matthias | Feb. 12, 1929 |
| 1,959,318 | Sundback | May 15, 1934 |
| 2,154,942 | Karmazin | Apr. 18, 1939 |
| 2,337,373 | Chernack | Dec. 21, 1943 |
| 2,388,297 | Slaughter | Nov. 6, 1945 |
| 2,516,864 | Gilmore et al. | Aug. 1, 1950 |
| 2,649,778 | Buffet | Aug. 25, 1953 |
| 2,676,127 | Hansen | Apr. 20, 1954 |
| 2,695,631 | Seck | Nov. 30, 1954 |